(12) United States Patent
Beukema et al.

(10) Patent No.: US 7,188,198 B2
(45) Date of Patent: Mar. 6, 2007

(54) METHOD FOR IMPLEMENTING DYNAMIC VIRTUAL LANE BUFFER RECONFIGURATION

(75) Inventors: Bruce Leroy Beukema, Hayfield, MN (US); Ronald Edward Fuhs, Rochester, MN (US); Calvin Charles Paynton, Byron, MN (US); Steven Lyn Rogers, Rochester, MN (US); Bruce Marshall Walk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 533 days.

(21) Appl. No.: 10/660,033

(22) Filed: Sep. 11, 2003

(65) Prior Publication Data

US 2005/0060445 A1 Mar. 17, 2005

(51) Int. Cl.
*G06F 3/00* (2006.01)
(52) U.S. Cl. .............................. 710/52; 710/54; 710/56; 710/5; 710/15; 710/36
(58) Field of Classification Search .................. 710/53, 710/54, 55, 56, 57; 709/200, 213
See application file for complete search history.

(56) References Cited

U.S. PATENT DOCUMENTS 5,953,746 A * 9/1999 Crocker et al. ............. 711/173
5,974,518 A * 10/1999 Nogradi ...................... 711/173
6,816,889 B1 * 11/2004 Graham ...................... 709/213
2003/0046505 A1 * 3/2003 Craddock et al. ........... 711/165
2003/0223416 A1 * 12/2003 Rojas et al. ................. 370/389
2004/0013068 A1 * 1/2004 Gregg ........................ 370/235

* cited by examiner

*Primary Examiner*—Kim Huynh
*Assistant Examiner*—Alan S. Chen
(74) *Attorney, Agent, or Firm*—Joan Pennington

(57) ABSTRACT

A method, apparatus and computer program product are provided for implementing dynamic Virtual Lane buffer reconfiguration in a channel adapter. A first register is provided for communicating an adapter buffer size and allocation capability for the channel adapter. At least one second register is provided for communicating a current port buffer size and one second register is associated with each physical port of the channel adapter. A plurality of third registers is provided for communicating a current VL buffer size, and one third register is associated with each VL of each physical port of the channel adapter. The second register is used for receiving change requests for adjusting the current port buffer size for an associated physical port. The third register is used for receiving change requests for adjusting the current VL buffer size for an associated VL.

18 Claims, 8 Drawing Sheets

METHOD FOR IMPLEMENTING DYNAMIC VIRTUAL LANE BUFFER RECONFIGURATION

FIELD OF THE INVENTION

The present invention relates generally to the data processing field, and more particularly, relates to a method, apparatus and computer program product for implementing dynamic Virtual Lane buffer reconfiguration.

DESCRIPTION OF THE RELATED ART

The design of computer interconnection fabrics is rapidly becoming as critical to the performance of an Information Technology environment as the servers used for running actual applications. Emerging practices have introduced the concept of dividing the available bandwidth on a network link into separate lanes known as Virtual Lanes (VLs). This allows for a degree of differentiated service between traffic flows. For example, high priority storage traffic can be directed to one VL, medium priority transaction requests to another VL, and low priority backup and archival operations on yet a third VL. It also generally implies that buffer resources critical to maintaining the flow of data on the link for a given VL are separated from the buffer space assigned to other VLs. This helps ensure that the traffic load on one VL does not impact the ability of another VL to make progress.

While this has improved the ability to deterministically manage the flow of data over interconnection fabrics, it leaves the hardware designer with a set of difficult trade-offs to make. Link buffer resource is a costly resource. When implemented directly on-chip, the link buffer resource quickly adds to the size and cost of an application specific integrated circuit (ASIC) but, generally yields superior performance results. When implemented external to an ASIC, the link buffer resource is also expensive in that it uses chip I/Os, requires additional memory components, more card space, and generally incurs a performance penalty.

This problem is further complicated by the dynamic configuration and workload characteristics of each separate application. Using an InfiniBand (IB) network as an example, one facility may choose to use a 2 port Host Channel Adapter (HCA) with one port active and the other port as an inactive alternate path. In this case, all of the buffer resource dedicated to the alternate path beyond the minimum required by the protocol, is left unused. In another example, a facility may choose to send all disk traffic, a stream of 4K data transfers, over one VL, while using a second VL for infrequent heartbeat information, 16 bytes of data, in a cluster that occurs once every few seconds. For an HCA designed with equal buffer space to each VL, this is clearly an inefficient and sub-optimal use of critical buffer resource.

SUMMARY OF THE INVENTION

A principal object of the present invention is to provide a method, apparatus and computer program product for implementing dynamic Virtual Lane buffer reconfiguration. Other important objects of the present invention are to provide such method, apparatus and computer program product for implementing dynamic virtual lane buffer reconfiguration substantially without negative effect and that overcome many of the disadvantages of prior art arrangements.

In brief, a method, apparatus and computer program product are provided for implementing dynamic Virtual Lane buffer reconfiguration in a channel adapter. A first register is provided for communicating an adapter buffer size and allocation capability for the channel adapter. At least one second register is provided for communicating a current port buffer size and one second register is associated with each physical port of the channel adapter. A plurality of third registers is provided for communicating a current VL buffer size and one third register is associated with each VL of each physical port of the channel adapter. The second register is used for receiving change requests for adjusting the current port buffer size for an associated physical port. The third register is used for receiving change requests for adjusting the current VL buffer size for an associated VL.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the preferred embodiment of the invention, a method, apparatus and computer program product are provided for implementing dynamic virtual lane buffer reconfiguration. The method, apparatus and computer program product of the preferred embodiment of the invention enable VL buffer resource resident on an adapter to be dynamically allocated between either ports, or virtual lanes within a port, while operating. An exemplary set of metrics is provided that allow applications to determine when buffer changes may be advantageous. These techniques contribute to the following advantages: An adapter designer can choose to implement a smaller on-chip set of VL Buffer knowing that it can be adjusted in the future as needed; reduces overall hardware cost; provides the mechanisms to respond to network congestion problems; and can adjust buffering to match desired Quality of Service policies.

Figure 1:
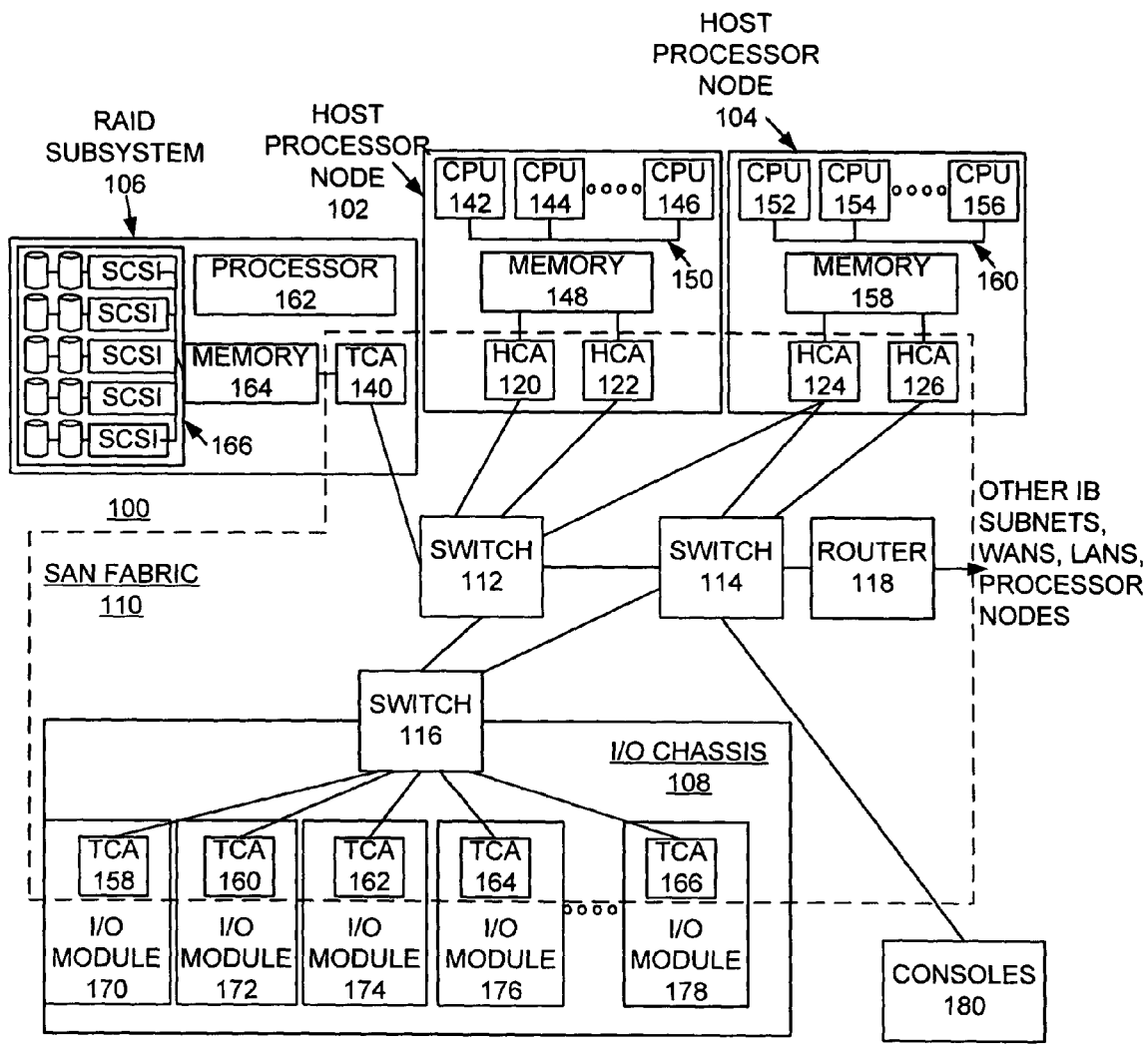
FIG. 1 is block diagram of a distributed computer system in accordance with the preferred embodiment.

Having reference now to the drawings, in FIG. 1, there is shown a distributed computer system in the form of a system area network (SAN) generally designated by the reference character 100 for carrying out methods for implementing dynamic virtual lane buffer reconfiguration of the preferred embodiment. As shown in FIG. 1, SAN 100 includes a host processor node 102, a host processor node 104, a redundant array independent disk (RAID) subsystem node 106, and an I/O chassis node 108. The preferred embodiment of the present invention is described in terms of the InfiniBand architecture; however it should be understood that the InfiniBand architecture is an example of one possible system area network in which the present invention may be used.

As shown in FIG. 1, SAN 100 includes a switched communications fabric 110, that allows many devices to concurrently transfer data with high-bandwidth and low latency in a secure, remotely managed environment. End nodes can communicate over multiple ports and utilize multiple paths through the SAN fabric 110. SAN fabric 110 includes a plurality of switches 112, 114, 116 connecting multiple links together to allow routing of packets from one link to another link within the subnet including host processor nodes 102, 104, RAID subsystem 106, and I/O chassis 108, and a router 118 for connecting to other InfiniBand subnets, wide area networks (WANs), local area networks (LANs), and processor nodes. A plurality of host channel adapters (HCAs) 120, 122, and 124, 126 couples the respective processor nodes, 102, 104 to the SAN fabric 110, and a plurality of target channel adapters (TCAs) 130, 132, 134, 136, 138, 140 couple peripherals of respective I/O chassis node 108 and RAID subsystem 106 to the SAN fabric 110.

InfiniBand networks provide for communication between TCAs 130, 132, 134, 136, 138, 140 and HCAs 120, 122, and 124, 126 in a variety of different manners. In the InfiniBand network data flows between end nodes on logical connections known as Queue Pairs (QPs) across a switched point-to-point fabric. Like other types of networks, InfiniBand networks have a physical layer, a link layer, a network layer, a transport layer, and upper-level protocols. As in other types of packet-switching networks, in InfiniBand networks particular transactions are divided into messages, which themselves are divided into packets for delivery over an InfiniBand network. When received by the intended recipient, the packets are reordered into the constituent messages of a given transaction. InfiniBand networks provide for queues and channels at which the packets are received and sent.

As shown in FIG. 1, host processor node 102 includes multiple central processing units 142, 144, 146, a memory 148 interconnected by bus system 150 and HCAs 120, 122. Host processor node 104 similarly includes multiple central processing units 152, 154, 156, a memory 158 interconnected by bus system 160 and HCAs 124, 126. RAID subsystem 106 includes a processor 162, a memory 164, a multiple storage disk unit 166, and TGA 140. TGA 140 can be a fully functional host channel adapter. I/O chassis 108 includes multiple I/O modules 170, 172, 174, 176, 178, for example, in the form of various adapter cards, such as a SCSI adapter card, a fiber channel hub and fiber channel-arbitrated loop (FC-AL) devices adapter card; an ethernet adapter card, a graphics adapter card, and a video adapter card. I/O modules 170, 172, 174, 176, 178 contain target channel adapters 158-166. I/O modules 170, 172, 174, 176, 178 can include switch 116 in the I/O adapter backplane to couple the adapter cards to the SAN fabric 110. Consoles 180 are coupled to switch 114 for providing external controls to the SAN 100.

The illustrated SAN 100 is not intended to imply architectural or functional limitations. The present invention can be used with various hardware implementations and network systems. For example, various topologies that are more or less complex are also possible; such as, a simple InfiniBand subnet having one switch, to which the HCAs and the TCAs connect through links.

Figure 2:
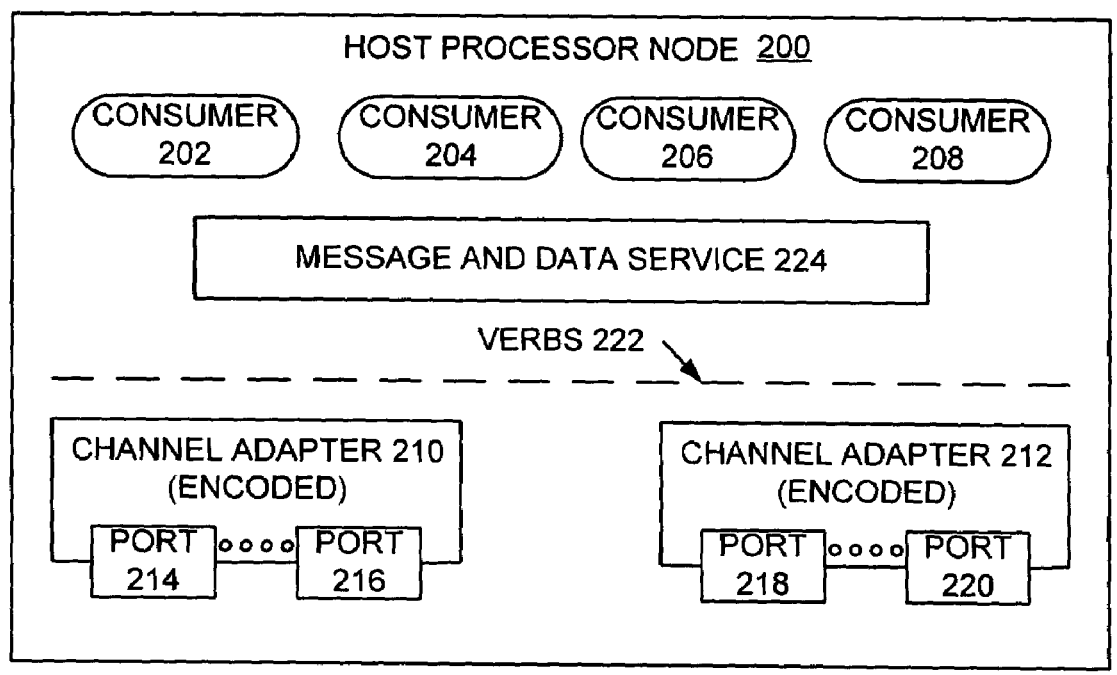
FIG. 2 is a functional block diagram of a host processor node in accordance with the preferred embodiment.

Referring to FIG. 2, there is shown a host processor node generally designated by reference character 200 in accordance with a preferred embodiment. Host processor node 200 is an example of a host processor node, such as host processor node 102 in FIG. 1. Host processor node 200 includes a set of consumers 202, 204, 206, 208, which are processes executing on host processor node 200. Host processor node 200 also includes a pair of channel adapters 210 and 212, such as HCAs. Channel adapter 210 contains ports 214 and 216 and channel adapter 212 contains ports 218 and 220. Each of the ports 214, 216, 218, and 220 connects to a link. The ports can connect to one SAN subnet or multiple SAN subnets. Consumers 202, 204, 206, 208 transfer messages to the SAN via a verbs interface 222 and a message and data service 224. The verbs interface 222 is essentially an abstract description of the functionality of a host channel adapter and basically, this interface defines the behavior of the host. The message and data service 224 is a higher-level interface than the verb layer 222 and is used to process messages and data received through channel adapters 210 and 212.

Figure 3:
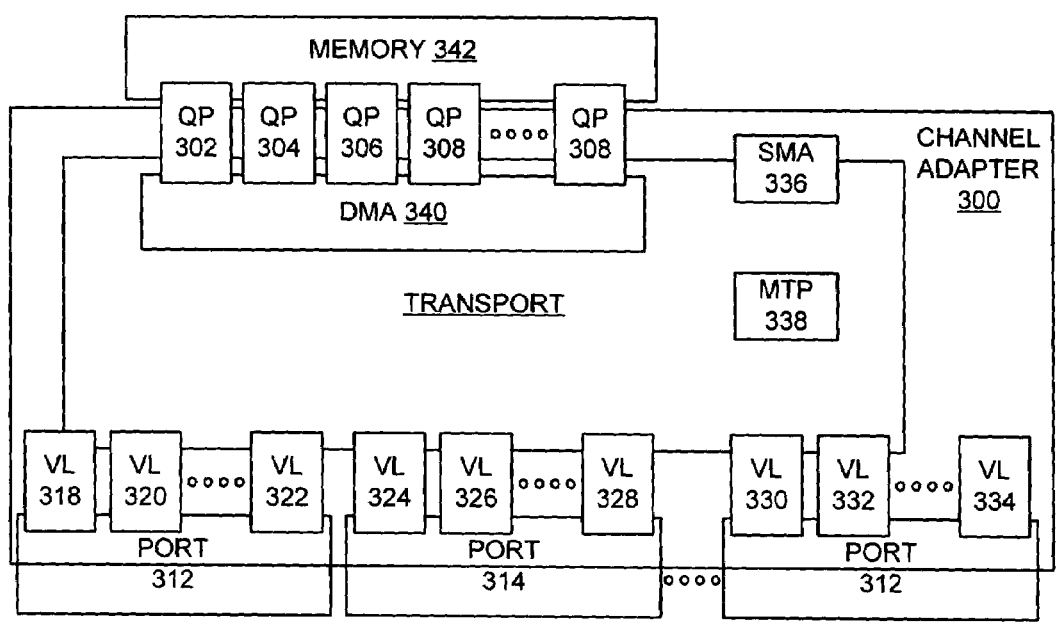
FIG. 3 is a diagram of a host channel adapter in accordance with the preferred embodiment.

Referring to FIG. 3, there is shown a host channel adapter generally designated by reference character 300 in accordance with a preferred embodiment. Host channel adapter 300 as shown in FIG. 3 includes a set of queue pairs (QPs) 302, 304, 306, 308, 310, that are used to transfer messages to the host channel adapter ports 312, 314, 316. Buffering of data to respective host channel adapter ports 312, 314, 316 is channeled through a plurality of virtual lanes (VL) 318, 320, 322, 324, 326, 328, 330, 332, 334, where each VL has its own flow control. A subnet manager (SM) (not shown) configures channel adapters with the local addresses for each physical port, i.e., the port's LID. A subnet manager agent (SMA) 336 communicates with the subnet manager for the purpose of configuring the channel adapter 300. A memory translation and protection (MTP) 338 translates virtual addresses to physical addresses and validates access rights. Direct memory access (DMA) 340 provides for direct memory access operations using memory 342 with respect to queue pairs 302, 304, 306, 308, 310.

Virtual lanes 318, 320, 322, 324, 326, 328, 330, 332, 334 are employed for numerous reasons, such as providing quality of service (QoS). For example, certain virtual lanes are reserved for high priority or isochronous traffic to provide QoS. Virtual lanes provide deadlock avoidance. Virtual lanes allow topologies that contain loops to send packets across all physical links and still be assured the loops do not cause back pressure dependencies that might result in deadlock. Virtual lanes alleviate head-of-line blocking. When a switch has no more credits available for packets that utilize a given virtual lane, packets utilizing a different virtual lane that has sufficient credits are allowed to make forward progress.

A single channel adapter, such as the host channel adapter 300 shown in FIG. 3 can support thousands of queue pairs. By contrast, a target channel adapter in an I/O adapter typically supports a much smaller number of queue pairs. Each queue pair consists of a send work queue and a receive work queue. The send work queue is used to send channel and memory semantic messages. The receive work queue receives channel and semantic messages. A consumer calls an operating-system specific programming interface, such as verbs interface 222 of FIG. 2 to place work requests onto a work queue.

Figure 4:
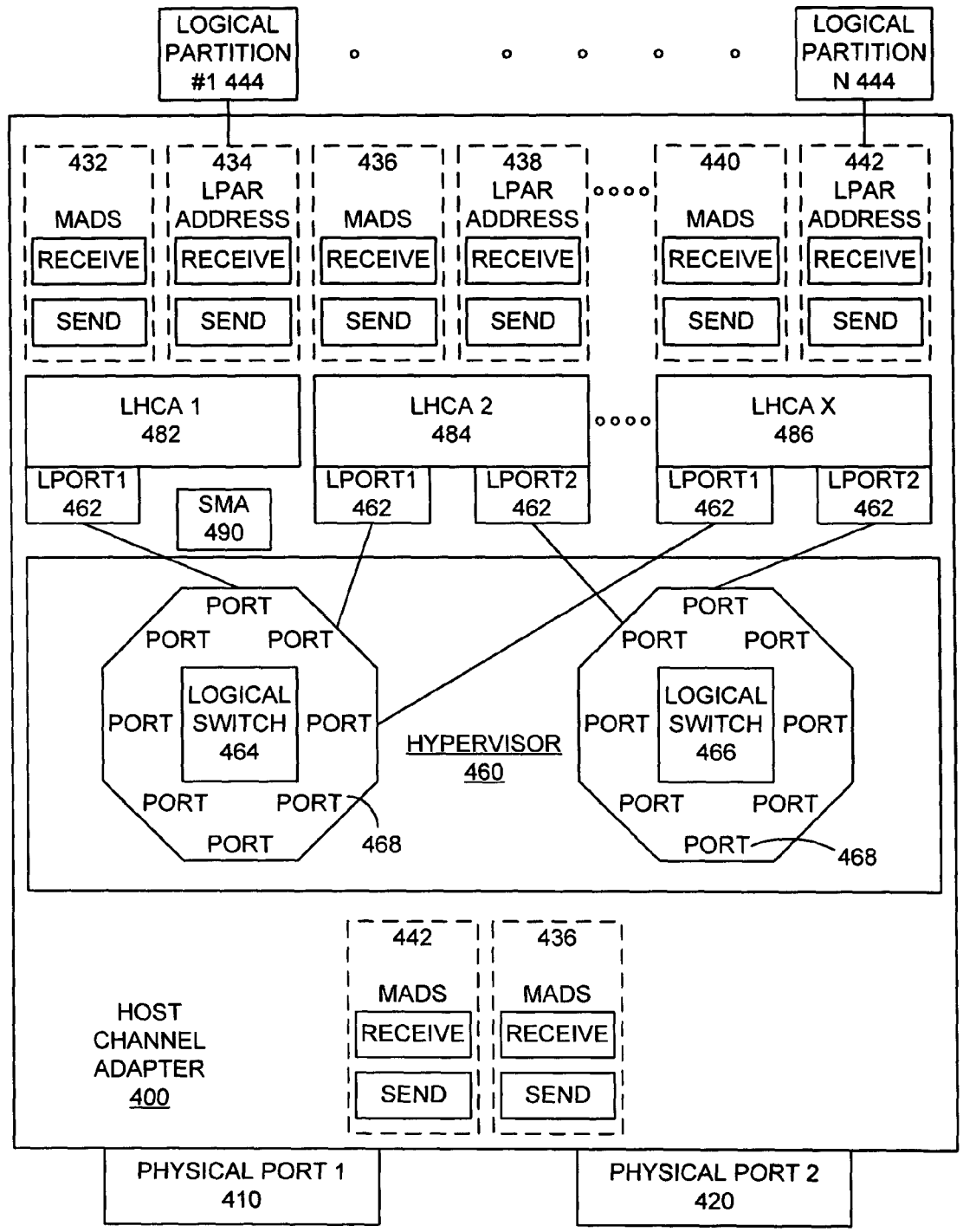
FIG. 4 is an exemplary diagram illustrating a logically partitioned host channel adapter in accordance with the preferred embodiment.

Referring to FIG. 4, there is shown a host channel adapter (HCA) generally designated by reference character 400 in accordance with a preferred embodiment. The host channel adapter 400 shown in FIG. 4 corresponds to the host channel adapter 300 illustrated in FIG. 3 but with the enhancements to provide for logical partition support within the host channel adapter. HCA 400 illustrates logical elements supported by the physical host channel adapter. HCA 400 includes two physical ports 410 and 420 similar to the host channel adapter shown in FIG. 3A. In addition, queue pairs 432, 434, 436, 438, 440, 442 are provided on the HCA 400 for the sending of data packets to, and receiving data packets from, host system resources.

Resources of the host system are logically partitioned into logical partitions #1–#N, 444 in a manner generally known in the art. In order for each logical partition (LPAR) 444 to have an architecturally accurate view of the host channel adapter 400, a hypervisor 460 creates the image of a logical host channel adapter with one or more logical ports (LPORTs) 462 attached to a logical switch 464, 466 that in turn is connected to a respective physical port 468 of the physical host channel adapter 400. The actions taken to do this involve allocating individual host channel adapter resources, such as queue pairs, completion queues, event queues, transmit and receive data counters, and memory translation table entries to each logical host channel adapter/ logical port. These allocations typically do not happen simultaneously as resource requests from applications are dynamic over time. However, as each resource is allocated, the hypervisor 460 assigns the logical partition identifier of the owning logical partition to the resource in order to verify ownership rights during operation.

Certain ones of the queue pairs 432, 434, 436, 438, 440, 442 in the HCA 400 are associated with the logical partitions #1–#N, 444 by way of a logical partition identifier assigned by hypervisor 460. For example, when an operating system of a logical partition requests the use of a queue pair that is not otherwise assigned to another logical partition, that queue pair will be assigned a logical partition identifier corresponding to the logical partition of the operating system. In this way, hypervisor 460, which is trusted code and has the highest privileges for accessing hardware resources, the operating system, and user applications associated with the logical partition of the operating system may access the queue pair. Further, the operating system and applications of the logical partition view the system as being dedicated to that operating system and applications and do not have knowledge of the other logical partitions.

Resources having the same logical partition identifier comprise a logical partition 444 of the HCA 400. The concept used in logical partitioning gives each operating system the view that they are operating in their own address space. The HCA hardware, however, is required to access data structures maintained both internally to the hardware as well as located in system memory at real memory addresses. Using the logical partition identifier associated with HCA resources along with the built-in HCA hardware checking, gives the hardware the means to ensure that all accesses it makes on behalf of work request stimuli, via queue pairs, are indeed valid for the requesting logical partition. Each logical partition 444 has its own address space to prevent access to the hardware resources of the logical partition by unauthorized software. Only the hypervisor 460, the operating system of the logical partition, and applications within the logical partition may access resources of the HCA 400 that are assigned to the logical partition.

In order to direct incoming data packets to an appropriate logical partition in the HCA and to direct outgoing data packets to an appropriate physical port from logical partitions, each logical partition includes a logical host channel adapter (LHCA) #1–#X, 482, 484, 486 with logical ports (LPORTs) 462, logical switches 464, 466 associated with physical ports 468, and a logical switch control point within the subnet management agent (SMA) 490. The Subnet Manager is capable of assigning unique logical identifiers (LIDs) and global identifiers (GIDs) to the logical HCA ports, and the hypervisor 460 updates queue pair facilities to associate each queue pair with a LID and GID. The hypervisor 460 maintains one or more tables that identify the unique LIDs and GIDs for the resources of each logical partition.

Each physical port 468 also provides additional facilities that are used to control whether packets to a particular Destination LID are routed out the physical port 410, 420 or to one of the queue pairs 432, 434, 436, 438, 440, 442 contained within the HCA 400. That is, the HCA hardware uses the port facilities to check inbound packets that are sent to a particular queue pair 432, 434, 436, 438, 440, 442 to ensure that they meet the queue pair attributes. HCA hardware also uses the port facilities to check outbound packets to determine whether the destination is another queue pair 432, 434, 436, 438, 440, 442 within the physical HCA 400, in which case the packet is routed to the internal queue pair 432, 434, 436, 438, 440, 442. The HCA hardware performs this check by looking at the destination logical identifier (DLID) to see if the DLID is assigned to a logical port defined on a logical host channel adapter 462 that is supported by this physical host channel adapter 1200. These internally routed packets are also checked to ensure they also meet the destination queue pair's attributes. Both the queue pair facilities and the port facilities are maintained by the hypervisor software 460 and create the logical view that a switch exists between the queue pair 432, 434, 436, 438, 440, 442 and the physical port 468. These logical switches are illustrated in FIG. 4 as logical switches 464, 466.

Figure 5:
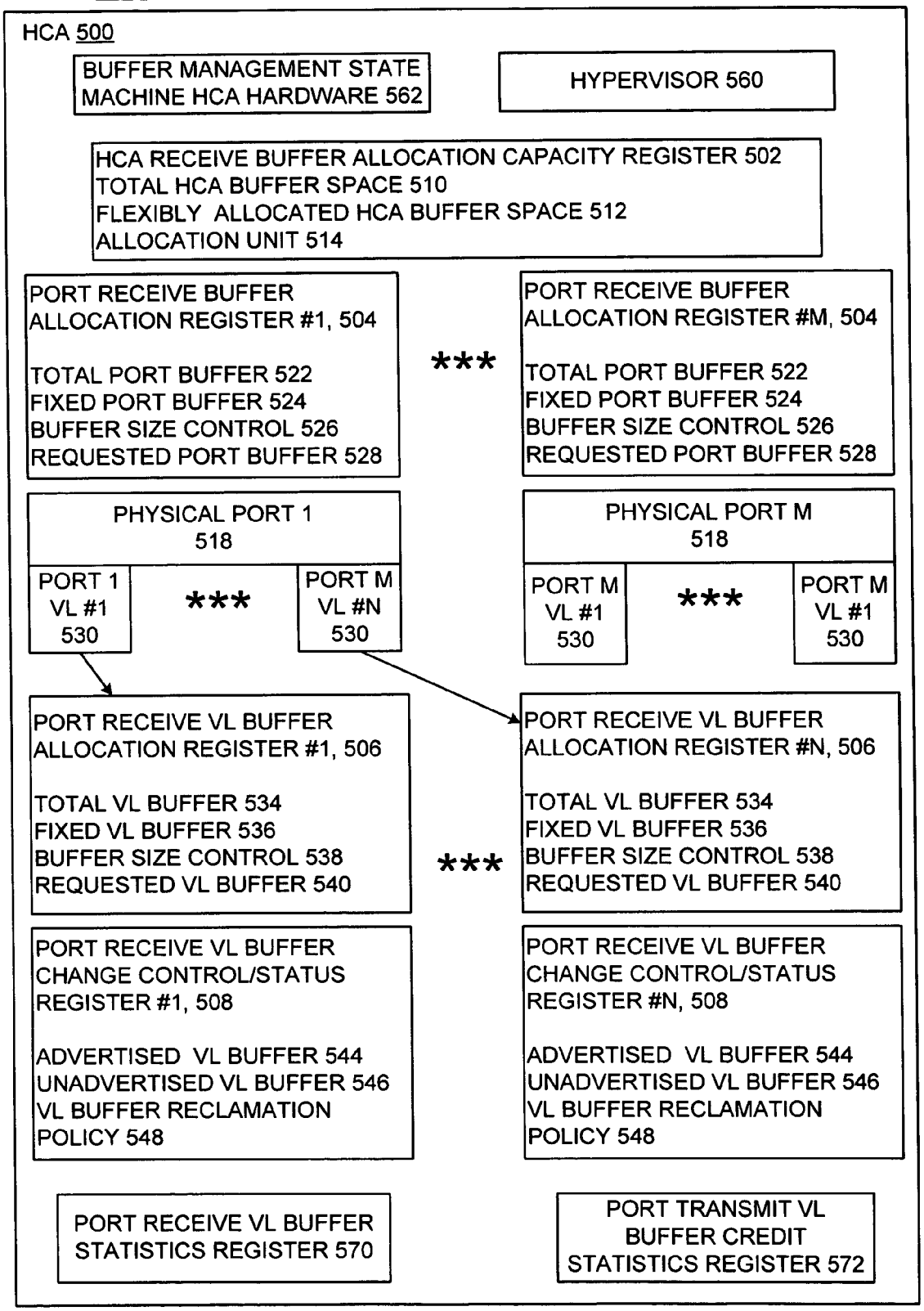
FIG. 5 is a functional block diagram of a receive virtual lane buffering apparatus for implementing dynamic virtual lane buffer reconfiguration methods in accordance with the preferred embodiment.

Referring now to FIG. 5, there is shown FIG. 5 a receive virtual lane buffering apparatus generally designated by HCA 500 for implementing dynamic virtual lane buffer reconfiguration methods in accordance with the preferred embodiment. While the invention is described in terms of receive buffering, it should be understood that principles of the invention also are applicable in similar manner to transmit buffering. The illustrated HCA 500 is an implementation for an InfiniBand HCA as one embodiment of this invention; however, the invention can be employed generally across other adapter environments that implement interconnection fabrics.

In accordance with features of the preferred embodiment, HCA 500 is used to dynamically allocate link buffer space between ports on a communications adapter and further allocate that buffer space between virtual lanes on each port, while maintaining link operation for data transfers. Advantages resulting from the dynamic Virtual Lane buffer reconfiguration methods of the preferred embodiment are applicable to the LPAR environments, such as illustrated in FIG. 4 where traffic in different logical partitions can be segregated to different virtual lanes. Based on performance goals, buffer space can, for example, be adjusted to meet performance goals of high priority or production LPARs while limiting buffer space for lower priority, development or test LPARs.

Also advantages resulting from the dynamic Virtual Lane buffer reconfiguration methods of the preferred embodiment are applicable to system workload balancing, similar to the LPAR environment, where as Queue Pairs are assigned to applications, the QPs can be segregated to different VLs based on performance objectives. Quality of Service (QOS) techniques can be used to help provide differentiated service to applications. As QOS goals change, for example based on time of day, the dynamic Virtual Lane buffer reconfiguration methods of the preferred embodiment enable changing hardware resources on the fly while maintaining operation. The dynamic Virtual Lane buffer reconfiguration methods of the preferred embodiment are applicable to Congestion Management. Interconnect fabrics can become congested under certain conditions. While the detection and recovery from fabric congestion is a complex topic, the dynamic Virtual Lane buffer reconfiguration methods provide one lever not previously available to help alleviate congestion.

One of the primary purposes of Virtual Lanes (VLs) is to provide independent buffering and flow control for separate data streams. HCA 500 defines a hierarchy of mechanisms to manage and allocate these VL buffers. The hierarchy includes three levels of mechanisms to communicate total receive buffer size and allocation capability for the adapter; mechanisms to communicate and optionally adjust allocation of receive buffering for each port; and mechanisms to communicate and optionally adjust allocation of receive VL buffering for each VL of each port.

HCA 500 includes a Receive Buffer Allocation Capability Register 502, at least one Port Receive Buffer Allocation Register #1–#M, 504, a plurality of Port Receive VL Buffer Allocation Registers #1–#N, 506, and a plurality of Port Receive VL Buffer Control/Status Registers #1–#N, 508.

Figure 6:
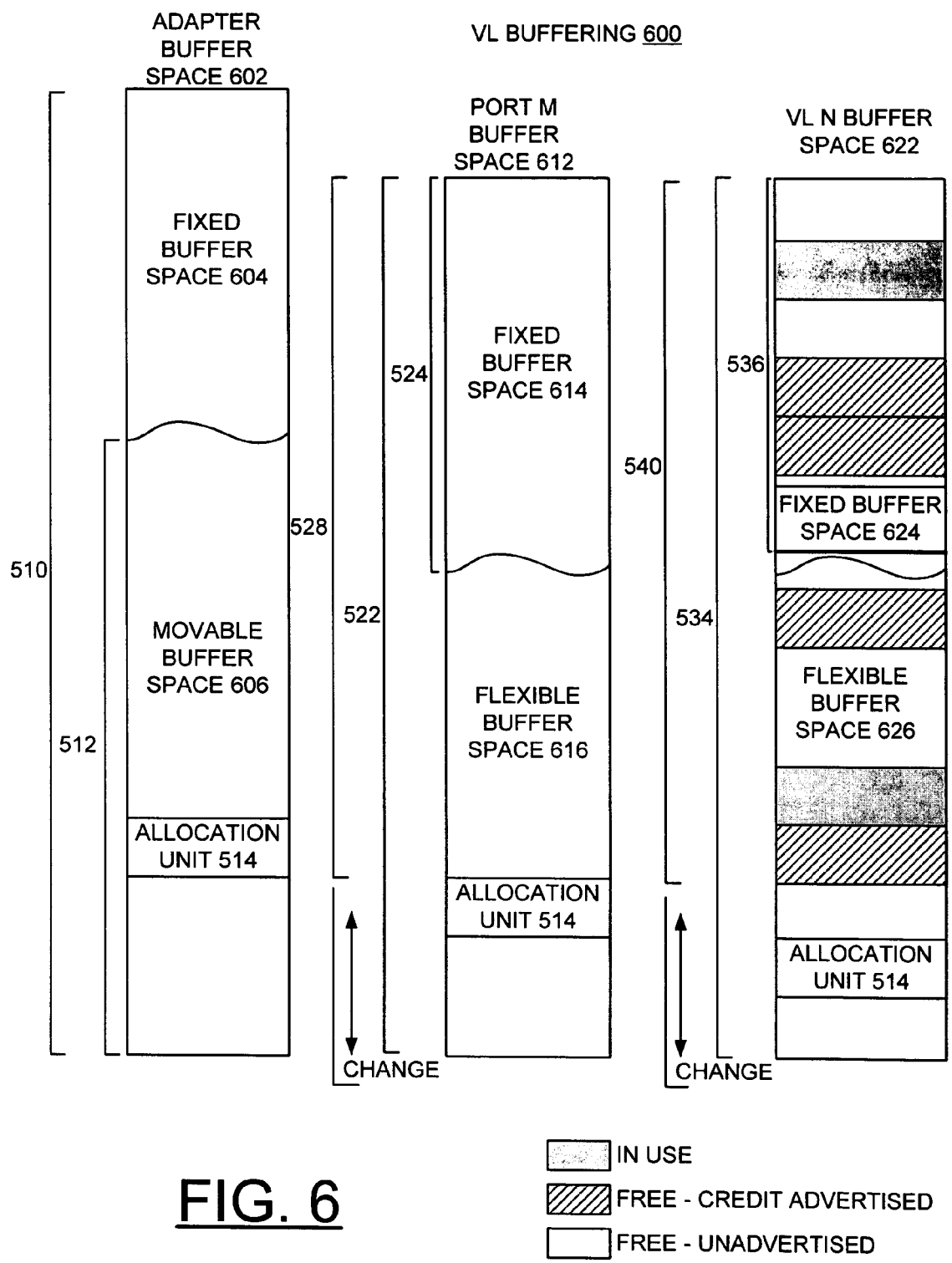
FIG. 6 is a block diagram illustrating a receive buffer apparatus in accordance with the preferred embodiment.

Referring also to FIG. 6, there is shown an exemplary receive buffering structure generally designated by 600 in accordance with the preferred embodiment. Receive buffering structure 600 includes an adapter buffer space 602 including a fixed buffer space 604 and a movable buffer space 606; a port M buffer space 612 including a fixed buffer space 614 and a movable buffer space 616; and a VLN buffer space including a fixed buffer space 624 and a movable buffer space 626. The locations for respective fields within registers 502, 504, 506 that control the allocation of each buffer structure 602, 612, 622 also are indicated in the receive buffering structure 600.

It should be understood that the present invention is applicable to various receive buffering implementations that may consist of a mix of VL buffers including dedicated and flexibly allocated buffer space, all fixed buffer space, or all flexibly allocated buffer space. While FIG. 6 may imply contiguous buffer space, the intent is to allow implementations complete freedom to perform buffer management using any policy appropriate to their application.

The HCA Receive Buffer Allocation Capability Register 502 implements the first level of the hierarchy. There is one HCA Receive Buffer Allocation Capability Register 502 for the HCA 500. This register 502 includes a plurality of fields including Total HCA Buffer Space 510, Flexibly Allocated HCA Buffer Space 512, and Allocation Unit 514. The Total HCA Buffer Space 510 communicates the total receive buffer space 602 implemented for this HCA 500 and includes any fixed buffer space 602 and movable buffer space 605 for all VLs across all ports. The Flexibly Allocated HCA Buffer Space 512 communicates the size of the movable buffer space 606 of the Receive Buffer space 602 that can be flexibly allocated between ports and implicit is the amount of the fixed Receive Buffer space 604 that is fixed to ports across the HCA 500. The Allocation Unit 514 communicates the unit of allocation granularity a particular HCA 500 uses. This Allocation Unit 514, similar to all values describing Receive Buffer space, is expressed, for example, in units of 64 byte blocks.

Port level buffer space allocation of the preferred embodiment uses the Port Receive Buffer Allocation Register 504. There is one Port Receive Buffer Allocation Register 504 for each physical port 1-M, 518 of the HCA 500. Port Receive Buffer Allocation Register 504 includes a plurality of fields of a Total Port Receive Buffer 522, a Dedicated Port Buffer 524, a Buffer Size Control 526, and a Requested Port Buffer 528. Total Port Receive Buffer 522 communicates the total current buffer space for a given port 518 of the HCA 500 and includes both fixed buffer space 614 and flexibly allocatable buffer space 616. Dedicated Port Buffer 524 communicates the current size of the fixed Receive Buffer space 514 that is fixed for the port 518, and implicit is the amount of flexibly allocable Receive Buffer space 616 currently allocated to the port. Buffer Size Control 526 is a control bit indicating whether or not the Receive Buffer size for the port can be changed. Requested Port Buffer 528 is used when changing the amount of buffer allocated to the particular port 518, representing the final value software is requesting the hardware for changing the port's buffer space 612.

The last level of the hierarchy deals with VL buffer allocation of Receive Buffer space between multiple VLs #1–#N, 530 of each port 1-M, 518 employing the Port Receive VL Buffer Allocation Registers #1–#N, 506, for example, for each VLn (n=0–15). There is one Port Receive VL Buffer Allocation Registers 506 for each supported VL #1–#N, 530 of a given port 518. Similar to the port level information, each of the Port Receive VL Buffer Allocation Registers #1-#N, 506 includes VL information fields including a Total VL Buffer 534, a fixed VL buffer 536, a Buffer Size Control 538, and a Requested VL buffer 540. Total VL Buffer 534 communicates the total receive buffer space for a VL 530 for a given port 518 of the HCA 500. Total VL Buffer 534 indicates the current size of the VL Buffer including both fixed and flexibly allocatable buffer space 624 and 626. Dedicated VL Buffer 536 communicates the current size of the Receive Buffer space that is fixed for this VL 530 and implicit is the amount of flexibly allocatable Receiver Buffer space 626 currently allocated to this VL 530. Buffer Size Control 538 is a bit indicating whether or not the Receive Buffer size for the VL can be changed. Requested VL Buffer 540 is used when changing the amount of buffer allocated to the VL 530, representing the final value software is requesting the hardware for changing the VL's buffer space 622.

In addition, the Port Receive VL Buffer Change Control/Status Register 508 is used when dynamically changing receive buffer space while a port 518 is operating. For example, for each VLn (n=0–15), there is one Port Receive VL Buffer Change Control/Status Register 508 for each supported VL 530 of a given port 518 including VL15. Port Receive VL Buffer Change Control/Status Register 508 includes multiple VL information fields including an Advertised VL Buffer 544, an Unadvertised VL Buffer 546, and a LV Buffer Reclamation Policy 548.

The following Table 1 summarizes the registers, and fields within registers 502, 504, 506, and 508, as shown in FIG. 5.

TABLE 1

| Register | Field |
| --- | --- |
| HCA Receive Buffer Allocation Capability Register 502 | Total HCA Buffer 510 |
| | Flexibly Allocatable HCA Buffer 512 |
| | Allocation Unit 514 |
| Port Receive Buffer Allocation Register 504 | Total Port Buffer 522 |
| | Fixed Port Buffer 524 |
| | Buffer Size Change Capability 526 |
| | Requested Port Buffer 528 |
| Port Receive VLn (n = 0–15) Buffer Allocation Register 506 | Total VL Buffer 534 |
| | Fixed VL Buffer 536 |
| | Buffer Size Change Capability 538 |
| | Requested VL Buffer 540 |
| Port Receive VLn (n = 0–15) Buffer Change Control/Status Register 508 | Advertised BL Buffer 544 |
| | Unadvertised VL Buffer 546 |
| | VL Buffer Reclamation Policy 548 |

HCA 500 includes a hypervisor 560 and buffer management state machine HCA hardware 562 to manage the buffer changes while maintaining link operation. HCA hardware 562 has interfaces for communication with software or hypervisor 560 in order to receive buffer change commands and reflect the status and progress of those commands. HCA hardware 562 contains interfaces that reflect buffer utilization information that enables software to implement policies to manage buffer changes based on application goals.

An additional set of information is provided in Port Receive VL Buffer Change Control/Status Register 508 to facilitate buffer allocation change during port operation. The Advertised VL Buffer 544 provides the summation of the free buffer space for this VL 530 being advertised as credits to the recipient on the other end of the physical link. The Unadvertised VL Buffer 546 provides the summation of the free buffer space for this VL 530 that has been released and has not been advertised as available via credits to the recipient. The VL Buffer Reclamation Policy 548 tells HCA 562 to either passively reclaim VL buffer by not advertising credits for space after it has been released, or to aggressively reclaim VL buffer space by reducing the number of credits by the requested delta and sending a flow control packet indicating the reduced value. When there is sufficient 'free but advertised' 64 byte blocks of buffer to fulfill the reduction request, and the HCA hardware 562 has sent out a flow control packet with the reduced credit count, the hardware may revert to the passive reclamation mechanism. When there is activity on a link for a given VL, HCA hardware 562 should be able to passively reclaim buffer space as incoming data is unloaded from the buffer. Aggressive reclamation should only be required on an inactive VL. In this case, it is acceptable to reduce the credits.

The VL Buffer Reclamation Policy 548 can be changed at any time. HCA hardware 562 is required to detect the writing of this register 508 and the subsequent change in state of the VL Buffer Reclamation Policy bit. HCA hardware 562 must then operate using the most appropriate reclamation policy based on the current state of the VLs receive buffer. The Advertised and Unadvertised VL Buffer counts 544, 546 enable software or hypervisor 560 to monitor the progress of requested buffer reconfiguration requests.

The use of HCA registers 502, 504, and 506 is further illustrated by the following description of one possible responsibility split between HCA hardware 562 and software or hypervisor 560.

Figure 7:
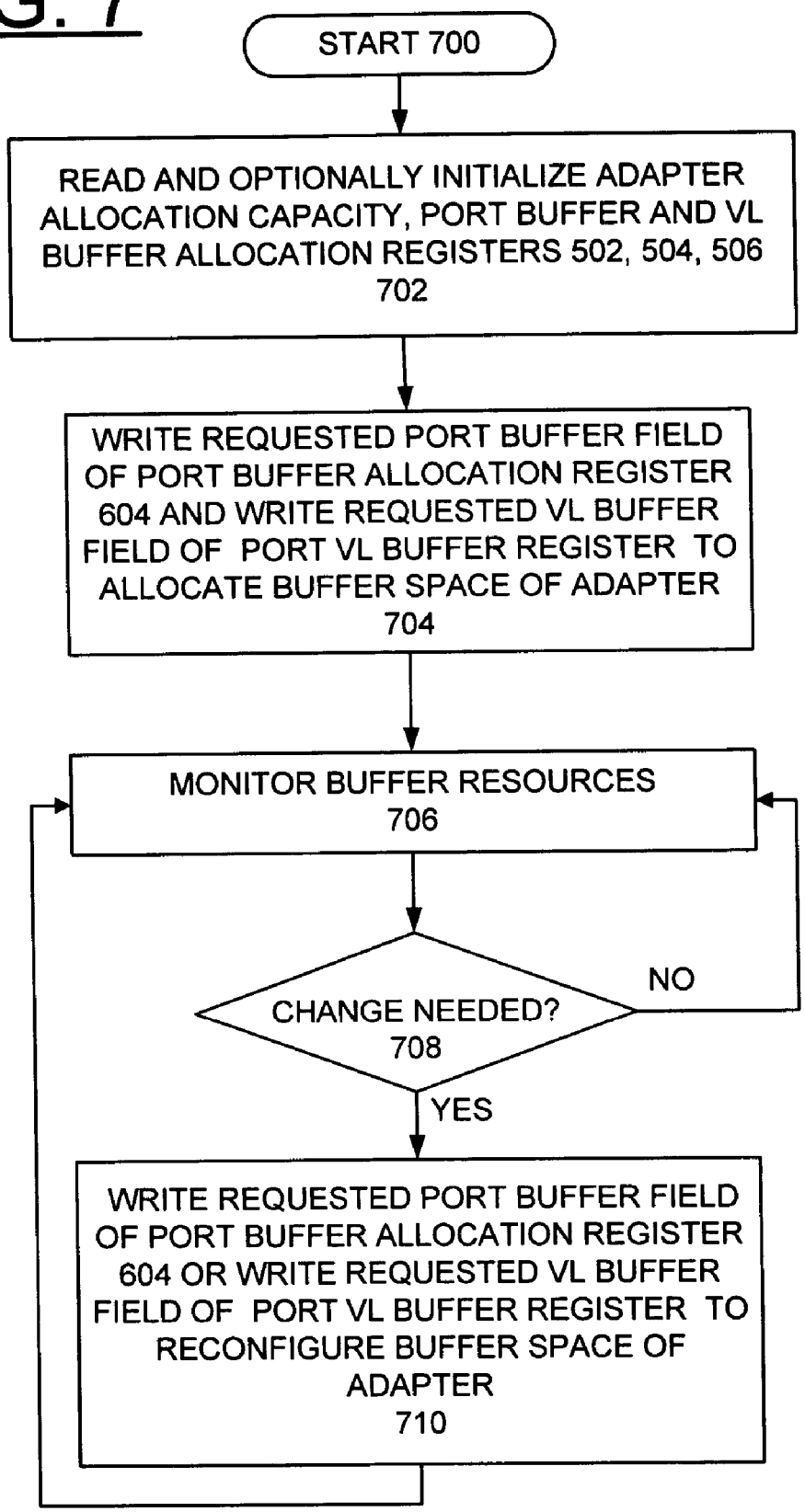
FIG. 7 is a flow chart illustrating exemplary steps performed by a hypervisor of the receive virtual lane buffering apparatus for implementing dynamic virtual lane buffer reconfiguration methods in accordance with the preferred embodiment.

Referring also to FIG. 7, there are shown exemplary steps performed by hypervisor 560 of HCA 500 for implementing dynamic virtual lane buffer reconfiguration methods in accordance with the preferred embodiment starting at a block 700.

At hardware power-up, HCA hardware 562 must Indicate Receive Buffer values that fall within the capability range of this hardware for each HCA Receive Buffer Allocation Capability Register 502, Port Receive Buffer Allocation Register 1-M, 504, and Port Receive VL Buffer Allocation Register #1–#N, 506.

After hardware power-up, as indicated in a block 702 hypervisor 560 is required to read and optionally initialize the Receive Buffer registers as follows: Read the HCA Receive Buffer Allocation Capacity Register 502, the Port Receive Buffer Allocation Register 504 for each port 518, and the Port Receive VL Buffer Allocation Register 506 for each VL 530 of each port 518.

When the Flexibly Allocatable Buffer field of the HCA Receive Buffer Allocation Capability Register is non-zero, as indicated in a block 704 hypervisor 560 is required to instruct the HCA hardware 562 to allocate buffer space via the Requested Port Buffer field 528 of the Port Receive Buffer Allocation Register 504 for each port 518, and the Requested VL Buffer field 540 of the Port Receive VL Buffer Allocation Register 506 for each VL 530, such that each VL of each port that hypervisor 560 intends to enable, has a minimum of 1 Maximum Transfer Unit (MTU) of buffer space allocated to it.

Hypervisor 560 must ensure that all buffer allocation requests 528, 540 to the hardware occur in even increments of allocation granularity 514. Hypervisor 560 must ensure that there is sufficient un-allocated buffer space 606 accessible within the scope of the request for the HCA hardware 562 to complete the request. HCA hardware 562 is required to manage Receive Buffer space including tracking un-allocated buffer space, allocating buffer space within the scope of it's implementation when requested by hypervisor 560, and reclaiming buffer space as requested by hypervisor 560.

As indicated in a block 706, hypervisor 560 monitors buffer resources and identifies when a change is needed as indicated in a decision block 708. When software or hypervisor 560 writes either the Requested Port Buffer size field 528 or the Requested VL Buffer size field 540 of the appropriate respective registers 504, 506 to HCA 500 that supports Receive Buffer configuration changes as indicated in a block 710, HCA hardware 562 must compare the respective requested values to the Total Buffer size 612, 622, add or remove free buffer space as required, and update the respective Total Buffer size 612, 622 to the Requested Buffer size 528, 540 to indicate completion.

In the unlikely event that hypervisor 560 requests the addition of buffer space but has not freed up sufficient space within an accessible scope, HCA hardware 562 will add all available buffer space and update the Total Buffer size to reflect the final size it could complete. An HCA implementation must document the maximum time required to perform a receive buffer configuration change assuming sufficient free buffer space as a guideline in setting software timeout values.

HCA 500 a Port Receive VL Buffer Statistics Register 570 and a Port Transmit VL Buffer Credit Statistics Register 572 that are provided to give hypervisor software 560 the ability to monitor buffer resources at block 706 and take whatever action is practical based on the environment and the implementations capabilities. The Port Receive VL Buffer Statistics Register 570 contains for each VL 530, a count of the number of times the number of available blocks of VL buffer transition from a non-zero value to zero. This corresponds to the number of time that zero credits have been advertised for this VL. When reset, the value of this counter becomes zero. The Port Receive VL Buffer Statistics Register 570 provides a Low Water Mark of the number of 64 byte blocks of Receive VL buffering that have been advertised as credits for this VL. When reset, the hardware inserts the current number of blocks being advertised as credits.

Port Transmit VL Credit Statistics Register 572 contains for each VL 530, a count of the number of times that the transmit hardware is unable to initiate or continue transmission of data on a VL because zero credits are available. Transmit hardware will detect and count instances where the VL is passed over during arbitration, i.e. initiation of transmission, as well as cases where transmission is cut off prior to VL tenure expiration.

Facilities are provided to enable/disable and reset the statistics on a VL basis. There is no threshold checking of these counts in this embodiment; however, threshold detection with notification via polling or interrupt mechanisms commonly practiced in the industry could be provided. They should be periodically polled by hypervisor 560 at a very low frequency or, based on other stimulus as divined by the hypervisor code, they may be polled on a more frequent basis in order to determine candidates for resource changes.

Figure 8:
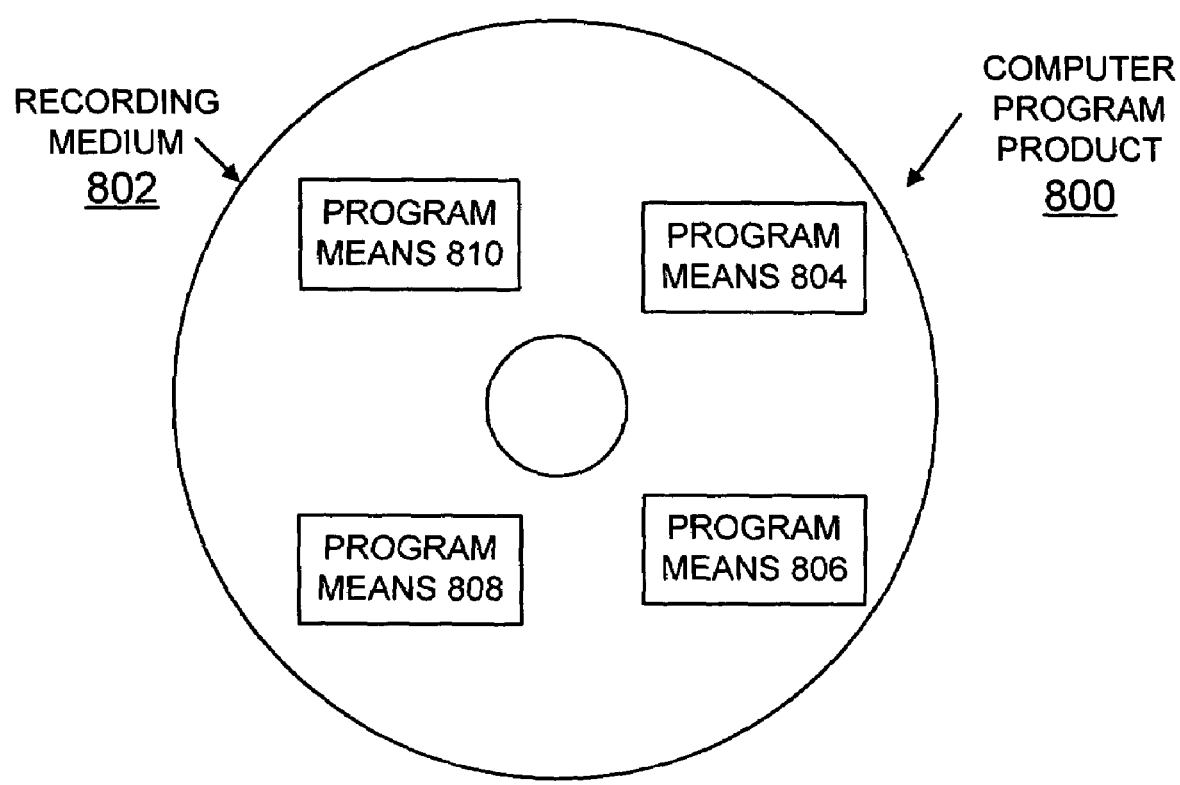
FIG. 8 is a block diagram illustrating a computer program product in accordance with the preferred embodiment.

Referring now to FIG. 8, an article of manufacture or a computer program product 800 of the invention is illustrated. The computer program product 800 includes a recording medium 802, such as, a floppy disk, a high capacity read only memory in the form of an optically read compact disk or CD-ROM, a tape, a transmission type media such as a digital or analog communications link, or a similar computer program product. Recording medium 802 stores program means 804, 806, 808, 810 on the medium 802 for carrying out the methods of the preferred embodiment in the HCA 500 of FIG. 5.

A sequence of program instructions or a logical assembly of one or more interrelated modules defined by the recorded program means 804, 806, 808, 810, direct the HCA 500 for implementing dynamic buffer reconfiguration of the preferred embodiment.

While the present invention has been described with reference to the details of the embodiments of the invention shown in the drawing, these details are not intended to limit the scope of the invention as claimed in the appended claims.

What is claimed is:

1. A method for implementing dynamic Virtual Lane (VL) buffer reconfiguration in a channel adapter comprising the steps of:
   providing a first register for communicating an adapter buffer size and allocation capability for the channel adapter;
   providing at least one second register for communicating a current port buffer size; one said second register associated with each physical port of the channel adapter;
   providing a plurality of third registers for communicating a current VL buffer size; one said third register associated with each VL of each said physical port of the channel adapter;
   utilizing said second register for receiving change requests for adjusting said current port buffer size for an associated physical port;
   utilizing said third register for receiving change requests for adjusting said current VL buffer size for an associated VL;
   providing a hypervisor for monitoring buffer resources, and
   using said hypervisor for writing chance requests to respective ones of each said second register and said third registers.

2. A method for implementing dynamic Virtual Lane (VL) buffer reconfiguration as recited in claim 1 wherein said first register includes predefined fields for storing said adapter buffer size, a flexibly allocated buffer space for the channel adapter, and an allocation unit for buffer allocation.

3. A method for implementing dynamic Virtual Lane (VL) buffer reconfiguration as recited in claim 1 wherein each said second register includes predefined fields for storing said current port buffer size, a fixed port buffer space and a requested port buffer size.

4. A method for implementing dynamic Virtual Lane (VL) buffer reconfiguration as recited in claim 1 wherein each said third register includes predefined fields for storing said current VL buffer size, a fixed VL buffer space and a requested VL buffer size.

5. A method for implementing dynamic Virtual Lane (VL) buffer reconfiguration as recited in claim 1 wherein utilizing third register for receiving change requests for adjusting said current VL buffer size for said associated VL includes the steps of utilizing said hypervisor for writing said change request to a requested VL buffer field of said third register for adjusting said current port buffer size for said associated physical port.

6. A method for implementing dynamic Virtual Lane (VL) buffer reconfiguration as recited in claim 1 further includes providing a plurality of change and status registers for communicating VL change and status values; one said change and status register associated with each said VL of each said physical port of the channel adapter register.

7. A method for implementing dynamic Virtual Lane (VL) buffer reconfiguration as recited in claim 1 further includes providing channel adapter hardware for managing allocation of buffer space responsive to said change requests written by said hypervisor.

8. A method for implementing dynamic Virtual Lane (VL) buffer reconfiguration as recited in claim 1 wherein providing said hypervisor for monitoring buffer resources includes providing at least one register for storing VL buffer usage statistics; and said hypervisor periodically polling said at least one register for storing VL buffer usage statistics.

9. A method for implementing dynamic Virtual Lane (VL) buffer reconfiguration in a channel adapter comprising the steps of:
   providing a first register for communicating an adapter buffer size and allocation capability for the channel adapter;
   providing at least one second register for communicating a current port buffer size; one said second register associated with each physical port of the channel adapter;
   providing a plurality of third registers for communicating a current VL buffer size; one said third register associated with each VL of each said physical port of the channel adapter;
   utilizing said second register for receiving change requests for adjusting said current port buffer size for said associated physical port includes the steps of utilizing a hypervisor for writing said change request to a requested port buffer field of said second register for adjusting said current port buffer size for said associated physical port; and utilizing said third register for receiving change requests for adjusting said current VL buffer size for an associated VL.

10. Apparatus for implementing dynamic Virtual Lane (VL) buffer reconfiguration comprising:
   a first register for communicating an adapter buffer size and allocation capability for a channel adapter;
   at least one second register for communicating a current port buffer size; one said second register associated with each physical port of the channel adapter;
   a plurality of third registers for communicating a current VL buffer size; one said third register associated with each VL of each said physical port of the channel adapter;
   a hypervisor for monitoring buffer resources;
   said hypervisor for writing change requests to said second register for adjusting said current port buffer size for an associated physical port;
   said hypervisor for writing change requests to said third register for adjusting said current VL buffer size for an associated VL; and
   channel adapter hardware for managing allocation of buffer space responsive to said change requests written by said hypervisor.

11. Apparatus for implementing dynamic Virtual Lane (VL) buffer reconfiguration as recited in claim 10 wherein said first register includes predefined fields for storing said adapter buffer size, a flexibly allocated buffer space for the channel adapter, and an allocation unit used for buffer allocation.

12. Apparatus for implementing dynamic Virtual Lane (VL) buffer reconfiguration as recited in claim 10 wherein each said second register includes predefined fields for storing said current port buffer size, a fixed port buffer space and a requested port buffer size; said hypervisor writes said change requests to said requested port buffer size field.

13. Apparatus for implementing dynamic Virtual Lane (VL) buffer reconfiguration as recited in claim 10 wherein said channel adapter hardware includes buffer management state machine hardware.

14. Apparatus for implementing dynamic Virtual Lane (VL) buffer reconfiguration as recited in claim 10 wherein each said third register includes predefined fields for storing said current VL buffer size, a fixed VL buffer space and a requested VL buffer size; said hypervisor writes said change requests to said requested VL buffer size field.

15. Apparatus for implementing dynamic Virtual Lane (VL) buffer reconfiguration as recited in claim 10 includes at least one register storing VL buffer usage statistics; and wherein said hypervisor for monitoring buffer resources includes periodically polling said at least one register storing VL buffer usage statistics.

16. A computer program product for implementing dynamic Virtual Lane (VL) buffer reconfiguration in a channel adapter of a system area network, said computer program product including a plurality of computer executable instructions stored on a computer readable storage medium, wherein said instructions, when executed by the channel adapter, cause the channel adapter to perform the steps of:
   communicating an adapter buffer size and allocation capability for the channel adapter using a first register;
   communicating a current port buffer size using a second register; one said second register associated with each physical port of the channel adapter;
   communicating a current VL buffer size using a third register; one said third register associated with each VL of each said physical port of the channel adapter;
   monitoring buffer resources with a hypervisor;
   writing a change request with said hypervisor to one said second register for adjusting said current port buffer size for said associated physical port; and
   writing a change request with said hypervisor to one said third register for adjusting said current VL buffer size for said associated VL.

17. A computer program product as recited in claim 16 wherein monitoring buffer resources includes periodically polling a register storing VL buffer usage statistics.

18. A computer program product as recited in claim 16 wherein said instructions, when executed by the channel adapter, cause the channel adapter to perform the steps of: writing said change requests responsive to monitoring buffer resources.

* * * * *

UNITED STATES PATENT AND TRADEMARK OFFICE
CERTIFICATE OF CORRECTION

| | |
|---|---|
| PATENT NO. | : 7,188,198 B2 |
| APPLICATION NO. | : 10/660033 |
| DATED | : March 16, 2002 |
| INVENTOR(S) | : Bruce Leroy Beukema et al. |

It is certified that error appears in the above-identified patent and that said Letters Patent is hereby corrected as shown below:

Claim 1, Col. 11, Line 3, "chance" should be --change--.

Signed and Sealed this

Eighth Day of May, 2007

JON W. DUDAS
*Director of the United States Patent and Trademark Office*

UNITED STATES PATENT AND TRADEMARK OFFICE
CERTIFICATE OF CORRECTION

PATENT NO.         : 7,188,198 B2
APPLICATION NO. : 10/660033
DATED                  : March 6, 2007
INVENTOR(S)       : Bruce Leroy Beukema et al.

It is certified that error appears in the above-identified patent and that said Letters Patent is hereby corrected as shown below:

Claim 1, Col. 11, Line 3, "chance" should be --change--.

This certificate supersedes Certificate of Correction issued May 8, 2007.

Signed and Sealed this

Twenty-ninth Day of May, 2007

JON W. DUDAS
*Director of the United States Patent and Trademark Office*